United States Patent [19]
Batzer et al.

[11] 3,971,197
[45] July 27, 1976

[54] COTTON DOFFER

[75] Inventors: Richard R. Batzer, Galesburg, Ill.; John D. Redmond, Littleton, Colo.

[73] Assignee: The Gates Rubber Company, Denver, Colo.

[22] Filed: Jan. 22, 1975

[21] Appl. No.: 543,081

[52] U.S. Cl. .................................................. 56/41
[51] Int. Cl.² .......................................... A01D 46/16
[58] Field of Search ............................... 56/40–50

[56] References Cited
UNITED STATES PATENTS

| | | |
|---|---|---|
| 2,693,071 | 11/1954 | Parkerton .................................. 56/41 |
| 2,738,636 | 3/1956 | Walker ..................................... 56/41 |
| 2,847,815 | 8/1958 | Rodow et al. ............................. 56/41 |
| 3,151,432 | 10/1964 | Sadler ....................................... 56/41 |
| 3,277,639 | 10/1966 | Sadler et al. ............................. 56/41 |

*Primary Examiner*—Russell R. Kinsey
*Attorney, Agent, or Firm*—H. W. Oberg, Jr.; Raymond Fink; Curtis H. Castleman, Jr.

[57] ABSTRACT

A cotton doffer with integrally molded elastomeric teeth in an annulus projecting from at least one side thereof, the doffer reinforced with a perforated disk having at least an annular portion embedded in the doffer to a point generally radially inward of the mid diameter of the annulus.

8 Claims, 5 Drawing Figures

COTTON DOFFER

BACKGROUND OF THE INVENTION

The invention relates to cotton harvesters, but more particularly, the invention relates to cotton pickers with rotary doffers.

Prior art cotton picker units use a plurality of coaxially spaced doffers having a plurality of radially aligned annular teeth to doff cotton from a plurality of coordinated barbed spindles. The arrangement and operation of the picking unit with doffers and spindles are well presented in the John Deere Publication A–29–74–2 entitled "Cotton Pickers and Strippers." The prior art doffer consists of a metallic backing plate or disk to which is adhesively bonded on one side a plurality of radially aligned, annular teeth of integrally molded rubber. The backing plate extends to a point well beyond the diameter which corresponds to the mid point of the annular teeth and substantially inhibits deflection of the teeth and doffer rim in an axial direction. Accordingly, the teeth of the doffer are free to deflect only generally circumferentially when cotton or other associated matter is doffed from the coordinated spindles. Should associated matter such as rocks, dirt or plant stock be carried to the doffer by the spindles, there is a strong likelihood that the teeth will quickly abrade or that spindles will break because of limited, if any, deflection afforded the doffer by the backing plate.

Another problem associated with prior art doffers is that the backing plates must be prepared on at least one surface to adhesively bond them to the rubber during molding and curing. The adhesive bond is subject to early failure which may render a picker unit inoperative. Thus the problems associated with the prior art doffer may be expressed in terms of the operating life of the doffer and the coordinated cotton picker spindles.

Yet another problem with prior art doffers is distortion of the backing plate which may cause the doffer to wobble during operation. The backing plate may be distorted by high pressures generated during the rubber molding process, or a distorted backing plate may be flattened during the rubber molding process.

SUMMARY OF THE INVENTION

A doffer is provided which may have the same general exterior shape as the above-described prior art doffer. The doffer is of general wheel shape and has a plurality of radially aligned, integrally molded annular teeth extending from at least one side thereof. A reinforcement in the shape of a disk is at least partially embedded in the doffer along generally at least a rim or annular portion of the disk. Preferably, the disk is perforated and has a diameter which extends to a point that is radially inward of the mid diameter of the tooth annulus. The perforations mechanically bond the disk to the integrally molded doffer body. The smaller size of the disk relative to the doffer body permits both circumferential and axial deflections of the doffer teeth and rim portion.

Optionally, the doffer body is of polyurethane for improved abrasion resistance. The doffer body may also include several layers of polyurethane materials having different moduli for the purpose of controlling rim and tooth flexibility.

Accordingly, it is an object of the invention to provide a doffer having circumferential and axial flexibility.

Another object of the invention is to provide a doffer with selected flexibility and which will appropriately doff cotton from spindles while minimizing breakage thereof.

It is another object of the invention to provide a doffer disk with a reinforcement that need not be treated for chemical adhesion.

Still another object of the invention is to provide a doffer having excellent abrasion resistance and controlled flexibility of the teeth and rim portions thereof.

An advantage of the invention is that a distorted reinforcement does not result from the manufacturing process.

These and other objects or advantages of the invention will be apparent by reviewing the drawings and description thereof wherein.

DESCRIPTION OF PREFERRED EMBODIMENT

In accordance with the invention, a doffer 10 for cotton is provided. The doffer is of the integrally molded type with a disk 12 reinforcement. The doffer includes a plurality of generally radially aligned teeth 14 which extend from at least one side of an annular area 16 of the doffer.

The doffer 10 is molded of elastomeric material such as the natural or synthetic rubbers and blends thereof, or from liquid materials such as polyurethane. Although the rubber materials will work, polyurethane is preferred because of its abrasion resistant characteristic and ease of attachment to an embedded reinforcement. Also, polyurethane is liquid cast or molded at pressures which are typically incapable of distorting the reinforcement.

Figure 4:
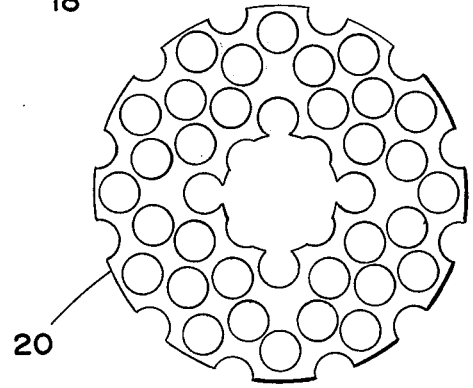
FIG. 4 is a plan view showing an alternate reinforcement of the invention.

The disk 12 preferably is of perforated metal with the perforations 18 extending at least through its annular portions. The disk may be fabricated from perforated sheet material 20 as shown in FIG. 4 where the perforations are randomly located in reference to its periphery and a concentric mounting hole. The perforations provide a means for mechanically attaching the disk to the molded doffer body. When liquid such as polyurethane is used, it readily flows through the perforations from one planar side of the disk to the other forming an excellent mechanical bond 22. There is no need to treat the disk for chemical adhesion with the elastomer. Also, the disk is not deformed by the liquid during the molding or casting process.

The diameter of the disk 12 is chosen such that when it is embedded in the doffer it extends to a point 24 that is radially inward of the rim at a diameter less than the mid diameter of the annulus 16 from which the teeth project. The doffer teeth may be of any shape but they typically include a profile 26 which is generally parallel to the plane of the disk. This assures proper engagement of the teeth with material doffed from a spindle 28. Webs 30 may be included to further reinforce the teeth but these webs are not considered for the purpose of this application as part of the annular tooth, as it relates to proper location of the reinforcement.

Figure 5:
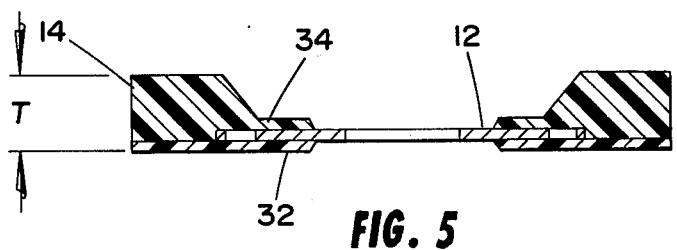
FIG. 5 is a view similar to FIG. 2 but showing a doffer with a layered elastomeric material.

A suitable polyurethane material which has exhibited the necessary flexing characteristic has a durometer range of 70–90 on the shore A hardness scale. Optionally, the elastomeric body may be formed in two or more layers to control flexibility of the doffer rim radially outward of the embedded reinforcement. For example, the doffer of FIG. 5 is constructed with layers of polyurethane. The first layer 32 is 10–30 percent of the doffer thickness T and has a durometer of 55–75 on the shore D hardness scale while the second layer 34 is 70–90 percent of the thickness having a hardness range of 65–95 as measured on the shore A hardness scale. The combined material has a combined deflection rate of generally 108 pounds per inch as measured in axial direction at the doffer rim.

Figure 1:
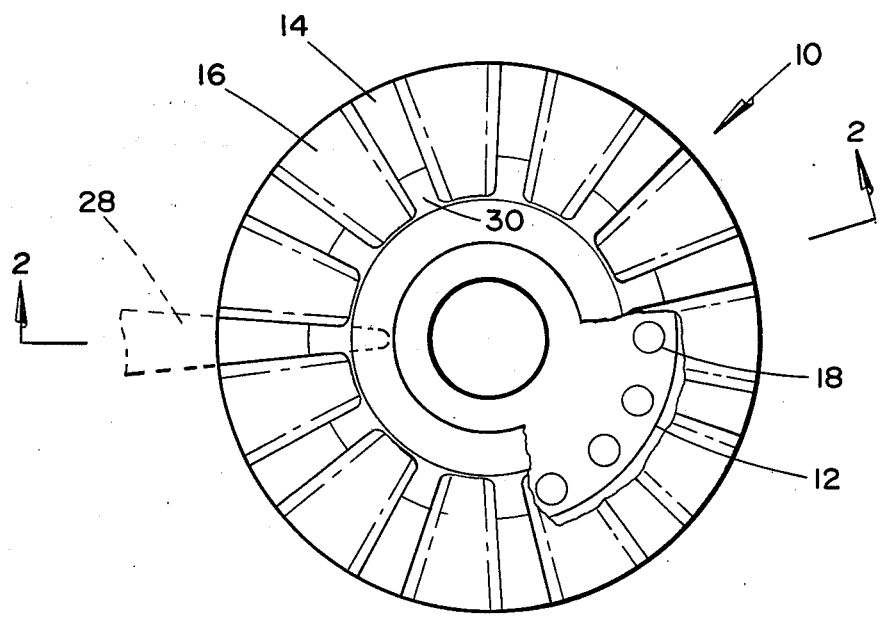
FIG. 1 is a partial cutaway plan view showing the tooth side of a doffer of the invention.
Figure 2:
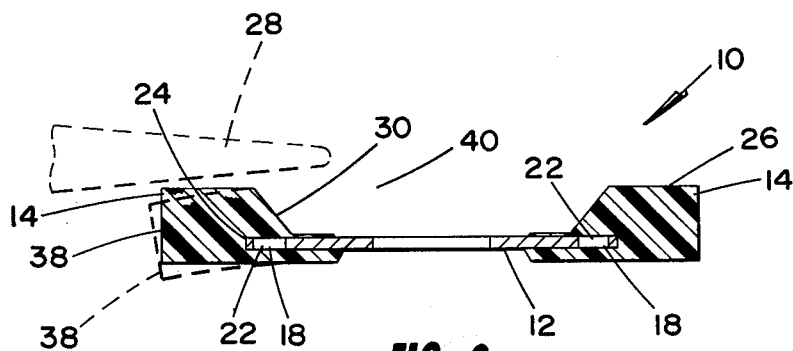
FIG. 2 is a view taken along line 2—2 of FIG. 1 and further including a schematical representation of a cotton spindle.
Figure 3:
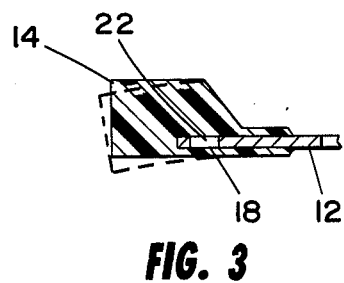
FIG. 3 is a view similar to FIG. 2 showing an optional reinforcement of the invention.

The teeth of the doffer are both capable of being circumferentially and axially deflected while the rim portion radially outward of the reinforcement is also capable of being axially deflected. When the doffer is in use it is operated in conjunction with a spindle 28 which moves in a coordinated fashion juxtaposed the doffer teeth with the axis of the spindle in a plane generally perpendicular to the axis of the doffer. Cotton and other associated material are picked up by the spindles and introduced to the doffer for removal. Sometimes large objects such as portions of stems, rocks or other debris are picked up by the spindles. The teeth of the doffer must be deflected to accommodate the mass of the doffed material. If there is insufficient space, the spindle may break. Prior art doffers permit only deflection of the tooth in a circumferential direction as it engages matter introduced by the spindles. The doffer of the invention is allowed to both circumferentially and axially deflect as indicated by the dotted lines in FIGS. 1 and 2. The axial deflections introduce a wave-like ripple 36 in the rim 38 of the disk to give further material clearance capability. By permitting the rim to deflect axially along with the doffer unnecessary breaking of spindles is precluded as well as unnecessary wear of the doffer teeth. For preferred deflection characteristics, the disk extends only to a diameter which corresponds to the minimum diameter of the tooth annulus. Different disk 12 diameters are illustrated in FIGS. 1–2 and 3. This permits a tooth to be deflected axially across its entire radial face. Elastomeric material having a durometer range of 65–95, shore hardness A, may be used with the various diameter disks. The disks diameter and durometer may be varied to effect desired axial deflections of the rim. Axial deflection rates with a range of 60 to 100 pounds per inch have proven satisfactory. Adequate clearance 40 is provided in the doffer radially inward of the teeth which negates any need for axially deflecting the disk in this area.

The foregoing detailed description is presented for illustration only and is not intended to limit the scope of the invention which is to be determined from the appended claims.

What is claimed is:

1. In a cotton doffer of the type having circumferentially spaced, integrally molded, generally radially aligned annular teeth extending from at least one generally planar side thereof, the improvement comprising:
    a perforated disk substantially concentric with and embedded in the doffer along at least one annular portion of the disk to a point generally radially inward of the mid diameter of the annular teeth whereby the rim of the doffer and at least half of each annular tooth are unsupported and deflectable at least generally normal to the planar side.

2. A doffer as set forth in claim 1 wherein at least that portion of the doffer extending radially beyond the perforated plate is comprised of at least two layers of elastomeric material where the modulus of one layer is substantially greater than the modulus of the remaining layer.

3. A doffer as set forth in claim 1 wherein the elastomeric material is polyurethane.

4. A cotton picker unit of the type having a plurality of coaxially spaced doffers adapted and arranged to doff cotton and associated matter from a plurality of coordinated spindles wherein improvement in the doffer comprises:
    an integrally molded body with circumferentially spaced, integrally molded, generally radially aligned annular teeth extending from at least one generally planar side thereof;
    a reinforcement comprising a perforated disk substantially concentric with and embedded in the body along at least an annular portion of the disk to a point generally radially inward of the mid diameter of the annular teeth, the rim of the doffer and at least half of each annular tooth are at least axially deflectable whereby the rim and portions of the teeth are deflectable by the cotton and associated matter introduced by the spindles.

5. The combination of claim 4 wherein the body is of polyurethane.

6. The combination of claim 5 wherein polyurethane through the perforations defines substantially the sole bond between the body and disk.

7. The combination of claim 5 wherein polyurethane through the perforations is stretchable to allow some relative movement between the disk and body as the disk is deflected.

8. In a cotton doffer of the type having circumferentially spaced, integrally molded, generally radially aligned annular teeth extending from at least one generally planar side thereof, the improvement comprising:
    a perforated disk substantially concentric with and embedded in the doffer along at least one annular portion of the disk radially inward of the doffer rim, integrally molded portions of the doffer extending through the perforations and stretchable to allow movement between the disk and integrally molded doffer and defining substantially the sole means for bonding the disk to the annular portion, whereby the rim of the doffer and portions of each annular tooth are deflectable normal to the planar side.

* * * * *